Figure 1:
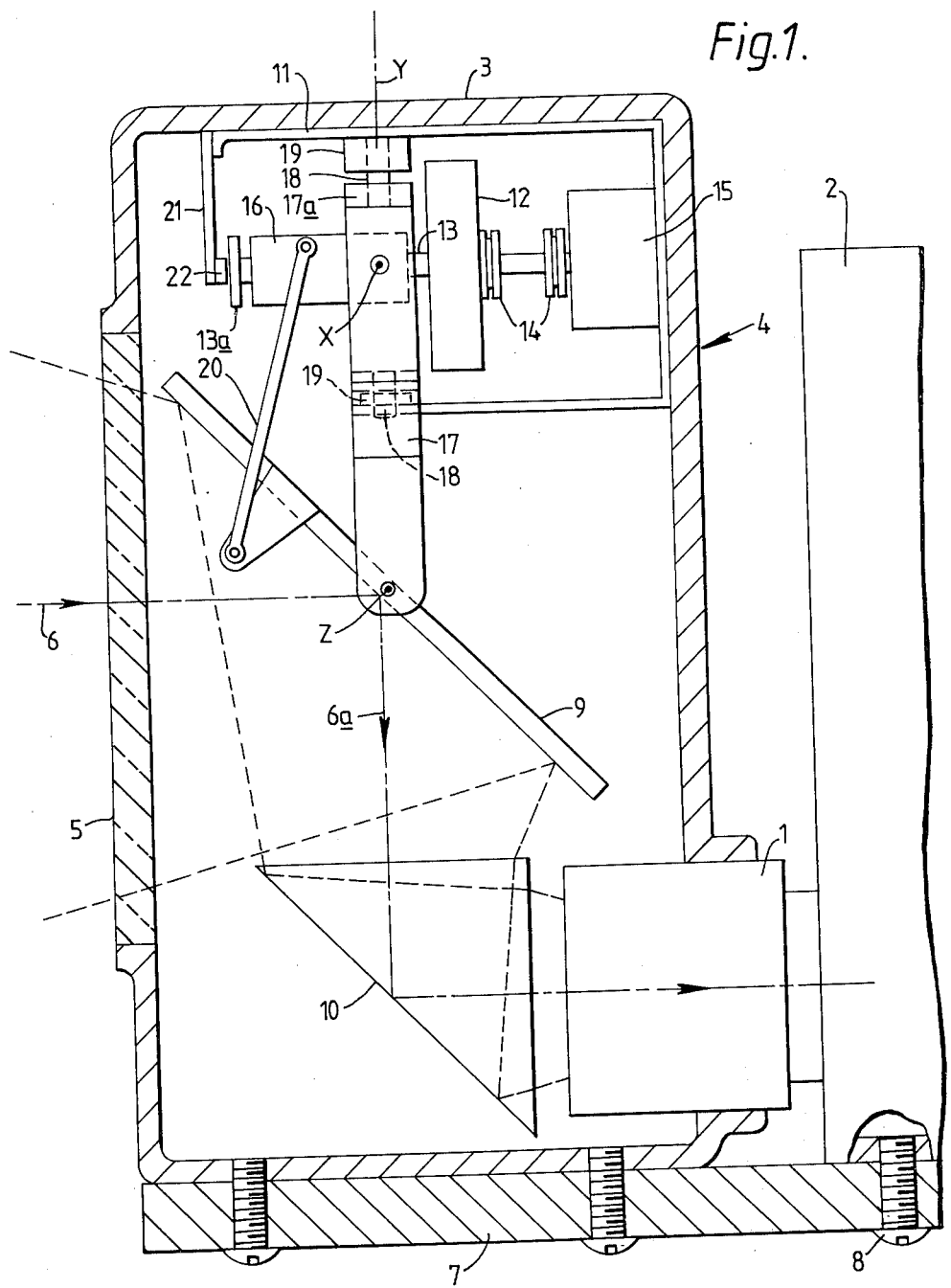

United States Patent [19]

Brake

[11] 4,322,128

[45] Mar. 30, 1982

[54] CONTROL DEVICE FOR OPTICAL APPARATUS

[75] Inventor: David G. Brake, Stevenage, England

[73] Assignee: British Aerospace, Weybridge, England

[21] Appl. No.: 96,150

[22] Filed: Nov. 20, 1979

[30] Foreign Application Priority Data

Nov. 23, 1978 [GB] United Kingdom ............... 45764/78

[51] Int. Cl.³ ............................................. G02B 17/00
[52] U.S. Cl. ....................................... 350/16; 350/25; 350/68
[58] Field of Search ......................... 350/16, 25, 26, 68

[56] References Cited

U.S. PATENT DOCUMENTS 3,482,897 12/1969 Hopp ..................................... 350/52

FOREIGN PATENT DOCUMENTS

| 1473898 | 8/1969 | Fed. Rep. of Germany . |
| 232759 | 4/1925 | United Kingdom . |
| 1114094 | 5/1968 | United Kingdom . |
| 1149164 | 4/1969 | United Kingdom . |
| 1235175 | 6/1971 | United Kingdom . |
| 1235707 | 6/1971 | United Kingdom . |
| 1236807 | 6/1971 | United Kingdom . |
| 1333591 | 10/1973 | United Kingdom . |
| 1399121 | 6/1975 | United Kingdom . |

Primary Examiner—John K. Corbin
Assistant Examiner—Matthew W. Koren
Attorney, Agent, or Firm—Cushman, Darby & Cushman

[57] ABSTRACT

A control device for optical apparatus, particularly an image stabilizer for a hand-held camera, comprises a control mechanism such as a gyroscope rotor or inertial mass mechanically coupled to a mirror which receives light from a scene viewed and reflects this light into a prism from which the light is further reflected to the apparatus. The gyroscope rotor or mass tends to maintain its position during vibration and tremor of the device and this relative movement is transmitted to the mirror to maintain steady the image seen by the apparatus. The material of the prism produces refractive effects which enable the mirror to be small enough to allow mechanical coupling thereof of the control mechanism, i.e. without servo-motors, while still accommodating the wide field of view normally accepted by a camera.

The invention may also be applied to a device which steers the line of sight of the apparatus.

5 Claims, 3 Drawing Figures

CONTROL DEVICE FOR OPTICAL APPARATUS

The invention relates to a steering or stabilising device for optical apparatus and is particularly, though not exclusively, concerned with a device for stabilising the image seen by or through an instrument such as a telescope or camera.

The image in an optical instrument such as a telescope, binocular or camera, may be stabilised to prevent or reduce the disturbing movement which would otherwise result from inadvertent motion of the instrument when used in a moving vehicle or when held in the hand.

One type of device providing image stabilisation embodies a gyroscope rotor or inertial mass coupled to a mirror which reflects light from the object approximately through a right angle prior to it entering the instrument. Examples of such devices are described in U.K. Pat. Nos. 1,114,094; 1,149,164 and 1,399,121 (equivalent to U.S. Pat. No. 3,881,803).

Generally the stabilising mirror must receive light directly from the object (in order to avoid reverse coupling between the gyroscope rotor or inertial mass and the stabilising mirror, which would degrade dynamic performance) so that the instrument must either point in a direction substantially at right angles to the direction of the object or a second reflecting surface must be interposed. The former method makes it difficult for the user to acquire and follow objects because, in a practical arrangement, elevation of the pointing direction requires a rotation of the instrument about its optical axis. The latter method, while being satisfactory in some cases, embodies a disadvantage particularly where the instrument accepts a substantial field of view. In such cases where, for example, the field of view exceeds 20 degrees, the separation of the stabilising mirror from the instrument lens along the optical axis due to the introduction of a second mirror, necessitates an inconveniently large stabilising mirror, so degrading its performance due to increased inertia.

Much of the prior art relating to the invention resides in the military field and, in particular, comprises various kinds of weapon aiming systems for use on board ships or in vehicles. Generally such systems comprise electrical servos coupled between the movement sensing gyroscope and the reflecting mirror so the allowable size of the mirror and the performance of the system is mainly determined by the electrical characteristics of the system. Being vehicle or ship mounted and good accuracy being an overriding criterion for such an application, these systems tend to be relatively complex, bulky and expensive.

Furthermore, such systems are generally used for sighting relatively distant objects so the angular field of view thereof may be relatively small.

It is an object of the present invention to provide an image stabilising device, for adaption to telescopes, cameras and such, of improved performance and of smaller size and lower weight, by allowing the use of a smaller lower-inertia mirror.

A further object of the present invention is to provide a stabilising device in the form of a dismountable attachment for a portable camera to enable the camera to take a steady picture even while it is hand-held for example for news reporting and the like. To achieve this object the device has to be relatively light in weight and, compared with the kind of system used in the military field, inexpensive. Further the device must be readily adaptable to different kinds of camera and has to be able to accommodate the substantial field of view seen by a camera.

Accordingly one aspect of the invention comprises an optical path control device for use in conjunction with an optical instrument having a line of sight, the device comprising:

(i) support means for being fixed with respect to said optical instrument, (ii) a first reflecting surface movably mounted with respect to said support means and located in an optical path through the device, (iii) a mechanism supported by said support means and operable for controlling the movements of said first reflecting surface, (iv) a further reflecting surface located in said optical path for reflecting the optical path between said first reflecting surface and said line of sight of said instrument, and (v) transparent material which has a refractive index substantially greater than that of air arranged to contain a substantial proportion of said optical path.

Conveniently, the said material having a substantially greater refractive index than air is provided in the form of a prism which also defines said further reflecting surface.

According to a further aspect of the invention, there is provided an image stabilising device for a camera, e.g. a t.v. camera or a still or cine photographic camera, comprising a case having dismountable attachment means for securing the case to the camera with the camera lens communicating with an aperture in the rear wall of the case, a window in the front wall of the case for receiving light from a scene to be viewed and two reflecting surfaces in the case to reflect said received light into the camera lens, one reflecting surface being turnable about two axes and coupled to a gyroscope rotor or inertial mass to maintain the reflected light stationary with respect to the case and the other reflecting surface being the surface of a prism. Because of the prism, the movable reflecting surface can be substantially smaller for a given field of view of the camera than would be the case if the prism were replaced by a mirror and this, in turn, enables the movable reflecting surface to be mechanically coupled to the gyroscope rotor or mass without any interposed electrical servomotors and associated electronic circuitry and further enables the mirror to receive light direct from the scene to be viewed. Because of this, the stabilising device can be used in association with cameras having a wide range of different lenses.

The use of material having substantial refractive index e.g. the above-mentioned prism, has the effect of reducing the size of the envelope of light rays which has to be reflected by the stabilising mirror for a given size of the envelope of rays which enter the instrument's input pupil. Thus, the necessary size of the stabilising mirror is reduced. The refractive index is preferably at least 1.55. Better still it is at least 1.75.

Figure 2:
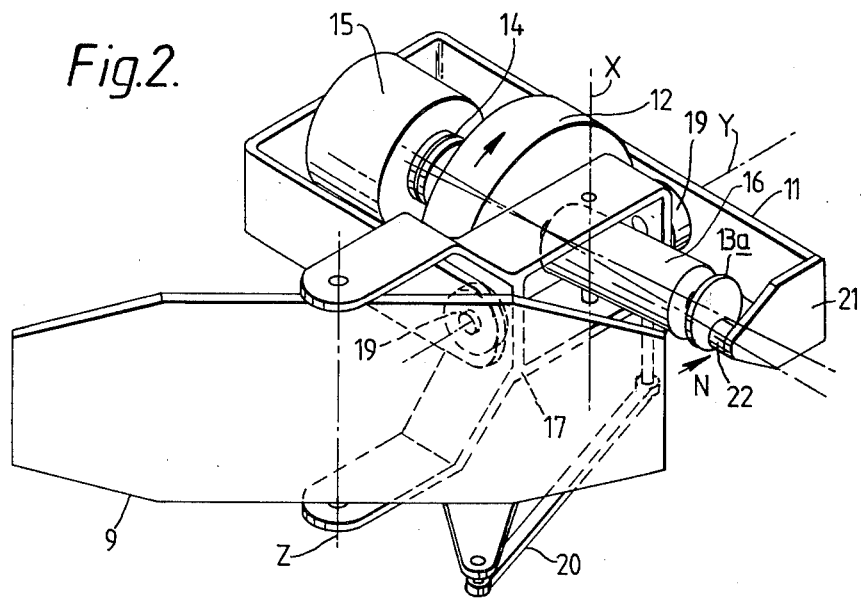
Figure 3:
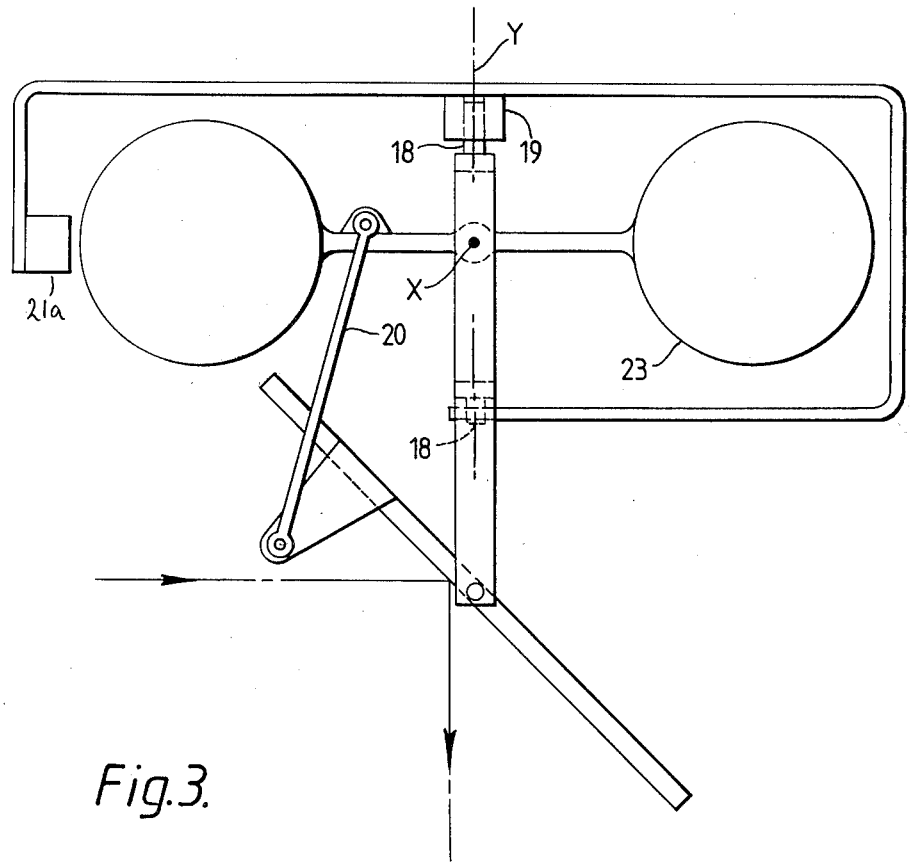

For a better understanding of the invention and to show how the same may be carried into effect, reference will now be made, by way of example, to the accompanying drawings, in which:

FIG. 1 is a sectioned side view of a stabilising device fitted to a partly shown television camera, FIG. 2 is a perspective view of part of the device of FIG. 1, and FIG. 3 is a diagrammatic view of part of a modification of the device of FIG. 1.

Referring to FIGS. 1 and 2, a lens 1 of a hand-held television camera 2 (only part of which is shown) is entered into an aperture in the rear wall of the case 3 of an image stabilising device 4. The case has a window 5 in its front wall to receive light, represented by the axial light ray 6, from the scene viewed. The image stabilising device is secured to the camera by means which may depend upon the construction of the camera. For example, the camera illustrated has threaded screw-holes in its base to enable it to be affixed to a tripod or the like. Therefore, it is convenient with this camera to fix to it an elongate plate 7 with screws 8 (only one of which can be seen) engaged in the aforementioned screw-holes and to fix the image stabilising device to the projecting front portion of the plate with similar screws. For another camera, it might be more convenient to secure the stabilising device to say a boom which may be provided on the camera.

Within the case 3 of the image stabilising device is a mirror 9 which reflects the light ray 6 through a right-angle towards a prism 10 mounted in front of the camera lens 1. The prism 10 reflects the light through a further right-angle into the lens 1. The mirror 9 is mounted such that it can turn about a vertical axis Y parallel to the portion 6a of the light ray 6 between the mirror and the prism, and about a horizontal axis X perpendicular to the plane of the figure. These movements are controlled by a stabilising mechanism such that, despite vibration or tremor of the camera and image stabilising device, the light ray portion 6a remains fixed in position in relation to the case 3, i.e. so that the scene viewed by the camera remains fixed relative to the frame of the camera.

The stabilising mechanism comprises a gyroscope rotor 12 fixed to a shaft 13 one end of which is coupled by way of two universal joints 14 to the output shaft of an electric motor 15.

The motor 15 is fixed to a frame 11 and is energised by a battery (not shown). The other end of the shaft 13 is supported via bearings (not shown) within a mounting block 16. The block 16 is mounted between the arms of forked gymbal member 17 such that the block 16, along with the gyroscope rotor 12, can turn about the axis X with respect to the gymbal member 17. The member 17 has two stub-shafts 18 fixed thereto, which stub-shafts are supported by bearing blocks 19 fixed to the frame 11 such that the member 17, along with the block 16 and the gyroscope rotor 12, can turn about the axis Y with respect to the housing 11. The ends of the arms of the forked gymbal member 17 support the mirror 9 between them such that the mirror can turn about an axis Z parallel to axis X. A link member 20 is pivotably coupled to the mirror 9 and the mounting block 16 so as to control movements of the mirror about axis Z in dependence upon the angular movement of the block 16 relative to the member 17. If the stabilizing device 4 moves, the gyroscope rotor 12 tends to maintain its position in space, i.e. it moves about axes Y and X in relation to the case 3. This relative movement is transmitted to the mirror 9 such that the light ray portion 6a remains fixed relative to the case 3 as described earlier.

The shaft 13 projects from the forward end of the block 16 and carries a disc 13a. A leaf spring member 21 is fixed to the frame 11 and extends in front of the disc 13a and carries there a friction pad 22.

When the case is rotated intentionally in order to steer the sightline i.e. to change the direction in which the camera is pointing, the friction pad 22, which in its central position is just clear of the rotating disc 13a rotates about the axes X and/or Y and touches the disc. For example, in FIG. 2, the case and pad are shown tilted downward relative to the disc which is touching the pad at a position below the disc's centre. Because the disc is rotating clockwise, the pad will apply a frictional force in the direction of the arrow N to the surface of the disc. This force results in a torque being applied to the rotor about the axis X which begins to precess the rotor downward about the axis Y to follow the movement of the case, according to the known rules of gyroscope motion. Because of the angular momentum of the rotor and the characteristics of the pad and spring, the system forms a low-pass frequency filter which reacts to slow steering actions but not to tremor and vibration and only if the case's movement is sustained will there be time for the rotor to catch up with the case.

Thus, the pad 22 and disc 13a form a steering device which allows movements of the camera and stabilising device greater than those associated with vibration and tremor i.e. intentional movements of the camera to change the scene viewed. Alternative steering means may be employed instead of the disc and pad. For example, a steering device is known which operates magnetically to apply a precessing torque to the rotor.

The described manner of operation in which the light ray remains fixed relative to the case of the stabilising device is known as "case stabilisation" or "frame stabilisation" and is the most desirable manner of operation where, as with the described embodiment, the intention is to stabilise the scene viewed by a camera. There is another kind of stabilisation which is known as "space stabilisation" and which is more desirable when the stabilising device is to be used in conjunction with a telescope or the like through which a scene is viewed by eye. Information about the construction of the stabilising device with a view to obtaining one or the other form of stabilisation may be found in the aforementioned Patent Specifications.

The camera lens 1 accepts an angular field of view of 30 degrees and, accordingly, the angle of the convergent envelope of useful light rays reflected from the mirror 9 is also 30 degrees. However, on entering the prism 10, this angle is reduced according to Snell's law of refraction so that, by the use of this prism as opposed to another mirror, the mirror 9 can be substantially smaller in area for the same field of view of the camera. The reduction in the angle depends upon the refractive index of the prism material, which index should therefore be as great as possible. In this embodiment, the prism is made of glass having a refractive index of approximately 1.75 and the angle of convergence of the light, while within the prism, is approximately 17 degrees. The use of such glass for prisms is not usual—normal glass has a refractive index of about 1.5. The glass used for the prism in this invention preferably has an index substantially greater than 1.55, for example the aforementioned 1.75. A range of specialised glasses including some having refractive indexes of the order mentioned are manufactured by the Schott Company, one such glass being that referred to by this Company as "LaSF 18".

Where the angular field of view is such that any of the ray angles within the prism are less than the critical angle for total internal reflection, the hypotenuse surface of the prism may be coated with silver, aluminium or other reflecting material.

As shown diagrammatically in FIG. 3, the stabilising mechanism could comprise an inertial mass instead of the motor driven gyroscope rotor of FIGS. 1 and 2. In FIG. 3, the inertial mass is formed by a dumbell 23 of which the central arm is pivotably mounted between the arms of a forked gymbal member 17 similar to the member 17 of FIG. 2. Pivotable movement of the dumbell 23 (about axis X) is transmitted to the mirror 9 by link 20 and, additionally, the mirror, the member 17 and the dumbell 23 can pivot about axis Y in bearing block 19 as before. A steering device 21, which can comprise a magnet, is provided to exert a restraint on the dumbell to cause it to follow large intentional movements of the camera (not shown in FIG. 3) while allowing the dumbell to tend to remain stationary in the face of vibration and tremor of the camera. Damping of the motion of the dumbell about axes X and Y is provided for example by the lubrication in the gymbal bearings. Alternatively, or in addition, piston and cylinder dampers (not shown) may be provided.

While the preceeding description has referred to optical instruments utilising light, the invention is equally applicable to instruments utilising radiation in the infra-red and ultra-violet regions of the electromagnetic spectrum, by using a prism made of a material which transmits such radiation. Thus, for example, the invention may be used to provide stabilisation to a thermal imaging telescope or camera.

Similarly, the invention may be applied to devices in which the radiation travels outward toward a distant target, such as a torch, light pointer, search-light, laser target marker or laser rangefinder.

The invention is also applicable to systems where the stabilising mirror does not reflect the incoming radiation through nominally a right angle but through some other nominal angle (for example, so as to provide space stabilisation rather than case stabilisation). In these instances the prism would be arranged to reflect the radiation through a similar angle so that the reflected axis is nominally parallel to the axis incident upon the stabilising mirror.

The invention is also applicable to systems in which the gymbal-mounted mirror is used to steer the incoming optical axis in addition to, or alternatively to, stabilising it.

I claim:

1. An image stabilising device for use in conjunction with a camera to stabilise the image seen by the camera, the device comprising:
   (i) A case having attachment means for removably attaching the case to said camera with the camera lens in optical communication with the interior of the case via a rear wall thereof, the case having a window in its front wall for receiving light from a scene to be viewed by the camera,
   (ii) a reflecting surface mounted inside said case for turning movement about two perpendicular axes and for receiving said light via said window and reflecting it,
   (iii) a motor driven gyroscope rotor mounted for rotation about an axis parallel to a line of sight of the device and coupled to said reflecting surface to control the turning movements thereof to maintain said reflected light stationary with respect to said case in the face of vibration and tremor of the camera,
   (iv) a prism mounted inside said case for receiving said reflected light and for further reflecting it into said camera lens, and
   (v) steering means for applying a force to said gyroscope rotor to cause it to follow an intended change in the direction of said line of sight.

2. An image stabilising device according to claim 1, wherein said steering device comprises frictional force applying means for applying a precessing torque to said gyroscope rotor.

3. An image stabilising device for use in conjunction with a camera to stabilise the image seen by the camera, the device comprising:
   (i) a case having attachment means for removably attaching the case to said camera with the camera lens in optical communication with the interior of the case via a rear wall thereof, the case having a window in its front wall for receiving light from a scene to be viewed by the camera,
   (ii) a reflecting surface mounted inside said case for turning movement about two perpendicular axes and for receiving said light via said window and reflecting it,
   (iii) an inertial mass mounted within said case for movement with respect thereto and coupled to said reflecting surface to control the turning movements thereof to maintain said reflected light stationary with respect to said case in the face of vibration and tremor of the camera, and
   (iv) a prism mounted inside said case for receiving said reflected light and for further reflecting it into said camera lens, and
   (v) steering means for applying a force to said inertial mass to cause it to follow an intended change in the direction of the line of sight of said device.

4. An image stabilizing device according to claim 1 or 3, wherein said prism is made of material of which the refractive index is at least 1.55.

5. An image stabilizing device according to claim 1 or 3, wherein said prism is made of material of which the refractive index is at least 1.75.

* * * * *